E. P. COOLEY.
Improvement in Whisk-Brooms.
No. 114,646. Patented May 9, 1871.
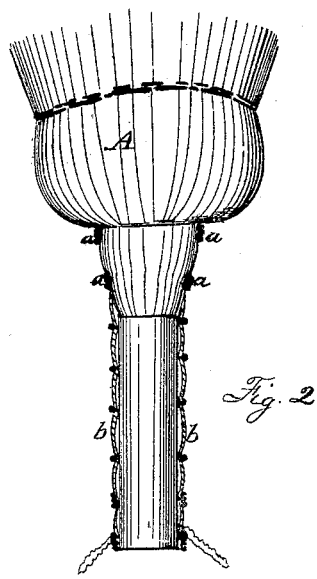
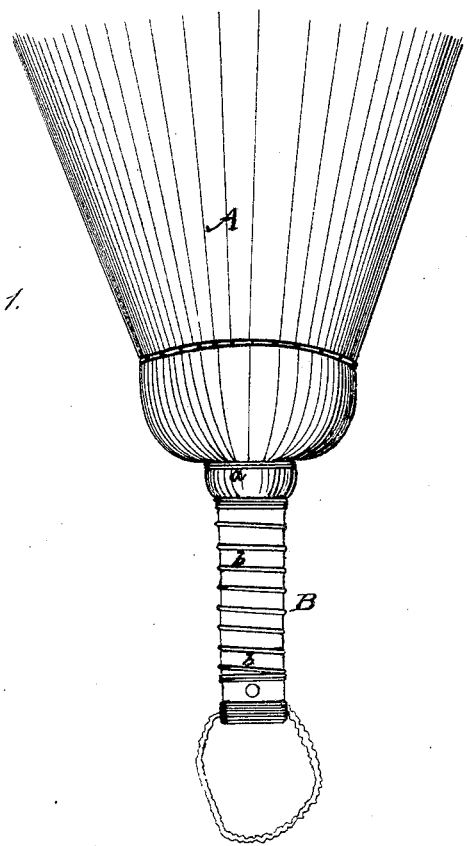

United States Patent Office.

ELI P. COOLEY, OF NEW YORK, N. Y.

Letters Patent No. 114,646, dated May 9, 1871.

IMPROVEMENT IN WHISK-BROOMS.

The Schedule referred to in these Letters Patent and making part of the same.

*To all whom it may concern:*

Be it known that I, ELI P. COOLEY, of the city and State of New York, have invented and made an Improvement in Brushes made of Broom-Corn; and the following is declared to be a correct description thereof.

My invention relates to brushes of the character usually known as whisk-brushes, in which a short handle is attached to a bunch of fine broom-corn so as to be adapted to brushing clothes.

Before my invention brushes of this kind had been made with a wooden handle projecting from the bunch of broom-corn, and varnished or otherwise made with an ornamental surface. The handle has also been covered by the fibers of such broom-corn extending longitudinally of the handle, and bound with a winding of wire.

My present invention is a new article of manufacture, consisting of a brush made of a bunch of broom-corn attached to the wooden handle, as heretofore; but the handle, instead of being varnished or painted, is covered with a sheet of flexible material, secured by a winding of wire, so as to make such handle ornamental and easily grasped for use, and at the same time the varnishing or painting of the handles is dispensed with.

In the drawing—

Figure 1 is a front view of a brush made according to my improvement, and

Figure 2 is an elevation, with the handle in section.

The portion A is made of broom-corn of the usual character, and connected to the handle B by a winding of wire.

The sheet of flexible material, such as thin leather, glazed cloth, or plush, is of a size to wrap around the handle B, as shown at *b;* and the winding of wire *a* is to be extended along the handle to the end to hold such sheet securely to the handle and produce an ornamental appearance.

A brush made with a handle of this kind is a new article of manufacture, and is superior to the brushes heretofore made, both in appearance and ease of handling.

I claim as my invention—

A brush made with a sheet of flexible material around the handle, extending from the broom-corn fibers to near the end of the handle, and secured by a winding of wire, as set forth.

E. P. COOLEY.

Witnesses:
ALBERT W. BROWN,
WM. F. MCNAMARA.